United States Patent
van Rensburg et al.

(10) Patent No.: US 7,366,140 B2
(45) Date of Patent: Apr. 29, 2008

(54) APPARATUS AND METHOD FOR SWITCHING TRANSMIT DIVERSITY IN A WIRELESS NETWORK

(75) Inventors: Cornelius van Rensburg, Dallas, TX (US); Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 11/056,216

(22) Filed: Feb. 11, 2005

(65) Prior Publication Data
US 2006/0203761 A1    Sep. 14, 2006

(51) Int. Cl.
*H04Q 7/00* (2006.01)
(52) U.S. Cl. .................... 370/334; 370/338; 455/562.1; 375/299
(58) Field of Classification Search ................ 455/101, 455/272, 279, 561, 562.1; 370/334, 208, 370/335–338, 342–345; 375/135, 299
See application file for complete search history.

(56) References Cited

U.S. PATENT DOCUMENTS

| | | | | |
|---|---|---|---|---|
| 6,021,166 A | * | 2/2000 | Suzuki | 375/347 |
| 6,212,242 B1 | * | 4/2001 | Smith et al. | 375/299 |
| 6,865,397 B2 | * | 3/2005 | Park et al. | 455/522 |
| 7,127,269 B2 | * | 10/2006 | Shih | 455/552.1 |
| 7,142,824 B2 | * | 11/2006 | Kojima et al. | 455/78 |
| 2003/0133493 A1 | * | 7/2003 | Suzuki et al. | 375/130 |
| 2006/0079275 A1 | * | 4/2006 | Ella et al. | 455/553.1 |
| 2006/0159194 A1 | * | 7/2006 | Magee | 375/267 |

* cited by examiner

*Primary Examiner*—Edward F. Urban
*Assistant Examiner*—Nhan T. Le

(57) ABSTRACT

A base station for communicating with mobile stations in a coverage area of a wireless network. The base station comprises a first transmit antenna, a second transmit antenna, and an RF transceiver for generating an outgoing RF signal to be transmitted via the first and second transmit antennas to the mobile stations. The base station also comprises a switch coupling the RF transceiver to the first and second transmit antennas. The switch alternately directs the outgoing RF signal to the first transmit antenna during a first portion of a forward channel data frame and directs the outgoing RF signal to the second transmit antenna during a remaining portion of the forward channel data frame.

17 Claims, 3 Drawing Sheets

APPARATUS AND METHOD FOR SWITCHING TRANSMIT DIVERSITY IN A WIRELESS NETWORK

TECHNICAL FIELD OF THE INVENTION

The present invention relates generally to wireless networks and, more specifically, to a transmit diversity scheme for use in a base station of a CDMA2000 wireless network.

BACKGROUND OF THE INVENTION

Wireless communications systems, including cellular phones, paging devices, personal communication services (PCS) systems, and wireless data networks, have become ubiquitous in society. To attract new customers, wireless service providers continually seek to improve wireless services cheaper and better, such as by implementing new technologies that reduce infrastructure costs and operating costs, increase handset battery lifetime, and improve quality of service (e.g., signal reception).

CDMA technology is used in wireless computer networks, paging (or wireless messaging) systems, and cellular phones. In a CDMA system, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, and spread prior to transmission by the mobile station. The data symbols following the interleaving block may be separated into an in-phase (I) data stream and a quadrature (Q) data stream for QPSK modulation of an RF carrier. One such implementation is found in the 1xEV-DV version of the IS-2000 standard. Similar implementations are found in IS-95 standard wireless networks.

In order to improve reception at the mobile station, wireless networks frequently employ transmit diversity, which uses two antennas—a main antenna and a diversity antenna—to transmit data in a forward channel (or downlink) to a mobile station. Even if incoming signals from one of the antennas are in deep fade, the spatial separation of the two base station antennas ensures that the mobile station receives signals from the other base station antenna that are not in deep fade.

Different forms of transmit diversity exist. Examples of transmit diversity include: 1) orthogonal transmit diversity (OTD); 2) space-time block codes (STBC) (e.g., Alamouti codes); and 3) phase sweep transmit diversity (PSTD). Typically, these prior art diversity schemes require either modification of the mobile station or continuous transmission of the overhead channels from both antennas, thus doubling the overhead. Moreover, a base station typically requires two RF transmit paths in order to process signals from the main antenna and the diversity antenna. However, this is very expensive solution.

Therefore, there is a need in the art for improved apparatuses and methods for using transmit diversity in a wireless network. In particular, there is a need for a CDMA base station that uses transmit diversity to communicate with mobile stations without requiring extensive modification of either the mobile stations or the base station.

SUMMARY OF THE INVENTION

The present invention provides a simple transmit diversity mechanism in a CDMA2000 base transceiver subsystem (BTS) without requiring any changes to the mobile station (MS). This is accomplished by switching the RF output of a single transmit path of the base station transceiver between two antennas during the transmission of a single data frame in the forward channel. In the ideal case, the present invention switches between the two transmit antenna while at 2M times the frame rate, where M is an integer and M=1 is the simplest implementation. The present invention combines the temporal diversity inherent in the interleaver and FEC codes with spatial diversity.

To address the above-discussed deficiencies of the prior art, it is a primary object of the present invention to provide, for use in a wireless network, a base station capable of communicating with a plurality of mobile stations in a coverage area of the wireless network. According to an advantageous embodiment of the present invention, the base station comprises: 1) a first transmit antenna; 2) a second transmit antenna; and 3) a radio frequency (RF) transceiver capable of generating an outgoing radio frequency (RF) signal to be transmitted via the first and second transmit antennas to the plurality of mobile stations. The base station further comprises: 4) a switch coupling the RF transceiver to the first and second transmit antennas. The switch alternately directs the outgoing RF signal to the first transmit antenna and the second transmit antenna.

According to one embodiment of the present invention, the switch directs the outgoing RF signal to the first transmit antenna during a first portion of a forward channel data frame and directs the outgoing RF signal to the second transmit antenna during a remaining portion of the forward channel data frame.

According to another embodiment of the present invention, the switch directs the outgoing RF signal to the first transmit antenna during approximately one-half of the duration of the forward channel data frame and directs the outgoing RF signal to the second transmit antenna during approximately one-half of the duration of the forward channel data frame.

According to still another embodiment of the present invention, the switch directs the outgoing RF signal to the first transmit antenna during approximately a contiguous one-half of the duration of the forward channel data frame and directs the outgoing RF signal to the second transmit antenna during approximately a contiguous one-half of the duration of the forward channel data frame.

According to yet another embodiment of the present invention, the switch alternately switches the outgoing RF signal between the first transmit antenna and the second transmit antenna at a rate that is approximately 2M times the frame rate of the forward channel data frame.

According to a further embodiment of the present invention, M is an integer value.

According to a still further embodiment of the present invention, the base station transmits according to the IS-2000 standard.

According to a yet further embodiment of the present invention, the base station transmits according to the IS-95 standard.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
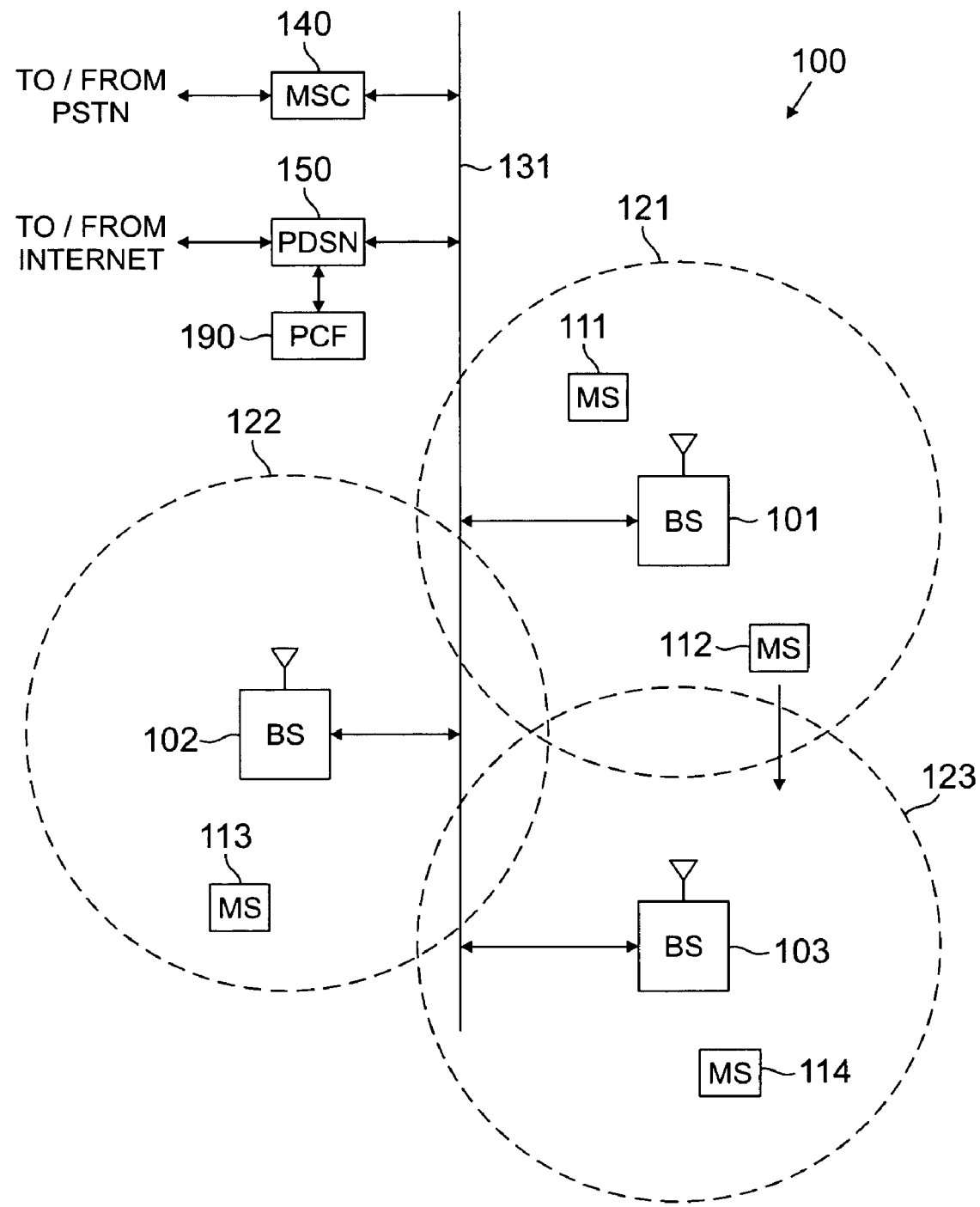
FIG. 1 illustrates an exemplary wireless network that implements transmit diversity according to the principles of the present invention.
Figure 2:
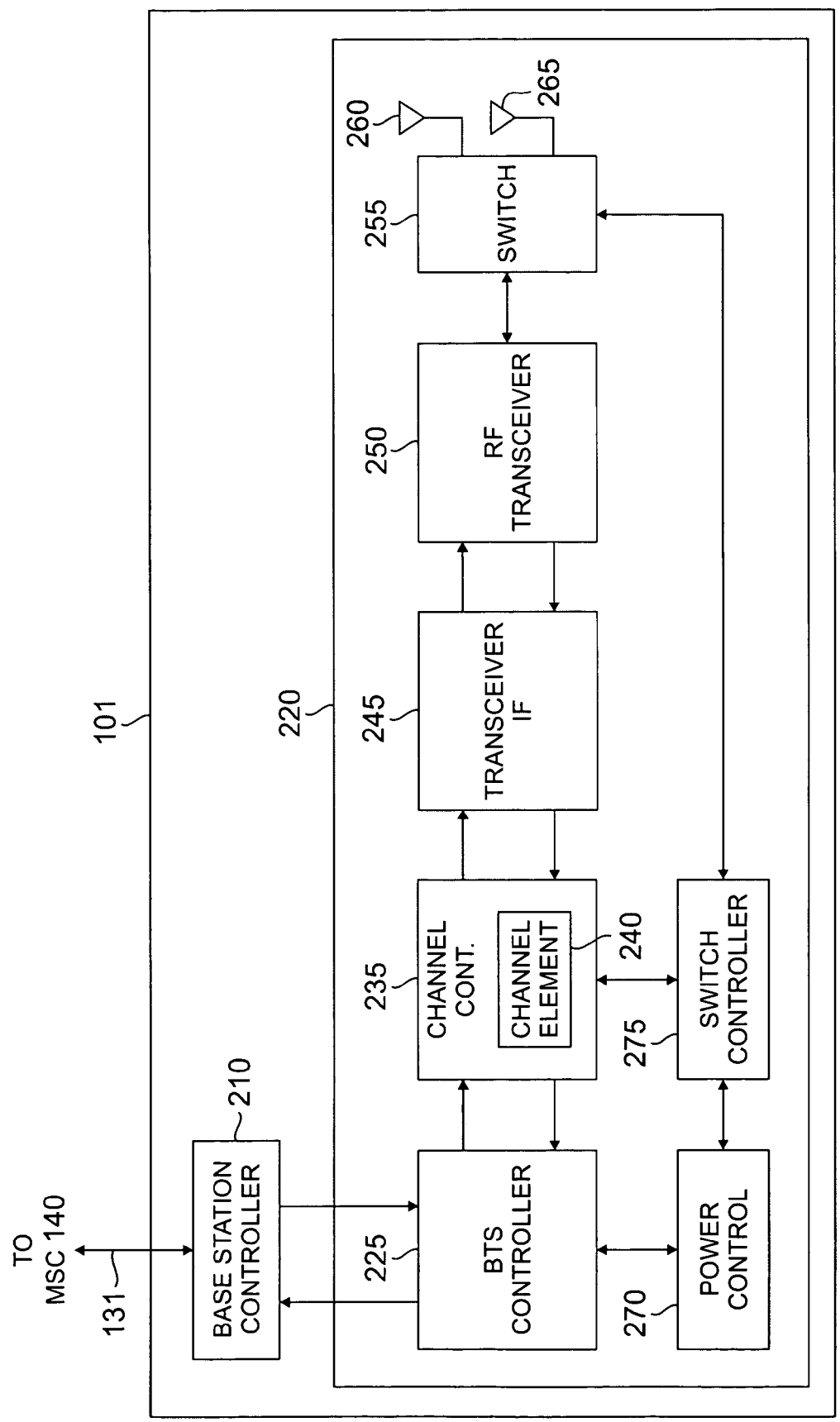
FIG. 2 illustrates an exemplary base station that implements transmit diversity according to the principles of the present invention.
Figure 3:
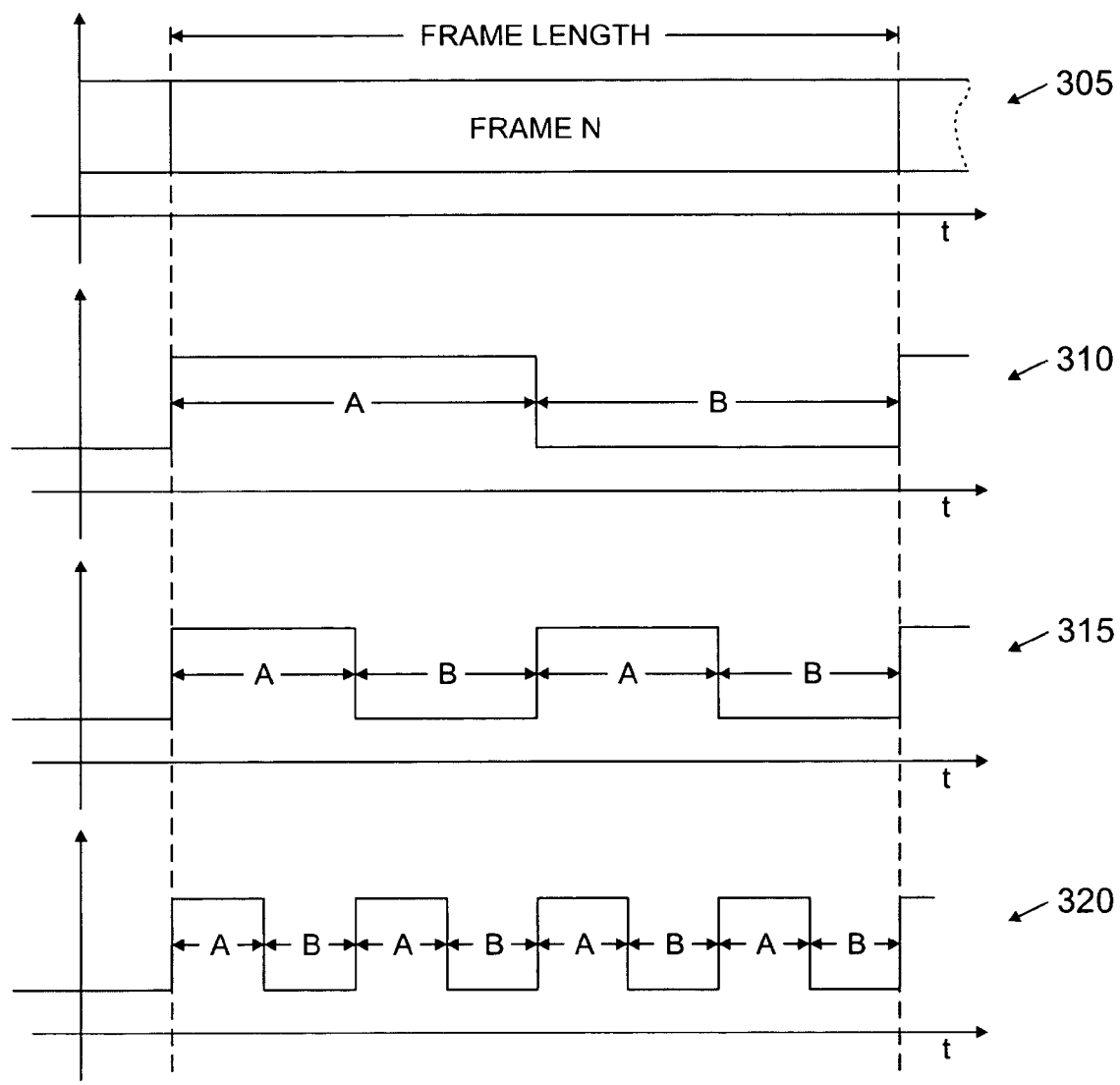
FIG. 3 depicts timing diagrams that illustrate transmit diversity operations in the exemplary base station according to exemplary embodiments of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100, which implements transmit diversity according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). Alternatively, wireless network 100 may transmit and receive over code division multiple access (CDMA) channels according to the IS-95 standard.

In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

FIG. 2 illustrates exemplary base station 101, which implements transmit diversity according to the principles of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which includes representative channel element 240), transceiver interface (IF) 245, RF transceiver 250, switch 255, antenna 260, antenna 255, power control block 270 and switch controller 275.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

Power control block 270 controls the reverse channel transmit power of the mobile stations communicating with BS 101. Power control block 270 may be implemented in software as part of BTS controller 225. However, for the purposes of illustrating and explaining the operation of the present invention, power control block 270 is depicted as a separate (or stand-alone) controller in FIG. 2.

Antennas 260 and 265 transmit forward channel signals received from RF transceiver 250 to mobile stations in the coverage area of BS 101. Antennas 260 and 265 also send to RF transceiver 250 reverse channel signals received from mobile stations in the coverage area of BS 101. In a preferred embodiment of the present invention, antennas 260 and 265 may be part of a multi-sector antenna system, such as a three-sector antenna system in which each antenna sector is responsible for transmitting and receiving in a 120° arc of coverage area.

In a conventional CDMA2000 base station, channel controller 240 receives forward channel data streams from a plurality of channel elements, such as channel element 240, adds forward error correcting (FEC) code data to the forward channel data streams, and then interleaves the forward channel data streams and FEC code data into a combined output data stream. The combined output data stream is organized in slots and frames and is multiplied by a pseudo-random noise (PN) long code in a PN generator. The bits in the output of the PN generator are then alternately sent to an in-phase (I) mixer and to a quadrature (Q) mixer. The I and Q mixers multiply the input data streams by Walsh codes to produce an I chip stream and a Q chip stream. The I and Q chip streams are then up-converted by RF transceiver 250.

The present invention implements a transmit diversity technique for the forward channel of the base station of a CDMA2000 wireless network or an IS-95 wireless network. According to the principles of the present invention, in the forward channel (or downlink), switch 255 provides transmit diversity by alternately switching the outgoing forward channel RF signals from RF transceiver 250 between antenna 260 and antenna 265. Switch controller 275 receives frame timing signals and slot timing signals from, for example, the block interleaver (not shown) or another component in channel controller 235. Switch controller 275 uses the frame and slot timing signals to control the switching operation of switch 255 between antenna 260 and antenna 265, as described below in greater detail.

The only modification required by the present invention to conventional CDMA2000 base station hardware is the addition of switch 255 at the output of RF transceiver 250 as shown in FIG. 2. Switch 255 periodically switches the output of RF transceiver 250 between antenna 260 and antenna 265 at least every 10 milliseconds. Ideally, each antenna transmits one-half of the interleaver frame length.

According to an exemplary embodiment of the present invention, switch 255 may have a settling time of at most 800 nanoseconds (e.g., approximately one chip length for CDMA2000). Commercial switches are available with a settling time of less than 150 nanoseconds. Slower switches with settling times less than one microsecond cost about one third of the fast switches. If a slow switch is used, then during the process of switching, the switch should transmit on both antenna 260 and antenna 265 in order prevent any data loss.

The present invention exploits the time diversity already employed in the forward error correcting (FEC) codes and the fact that the block interleaver scrambles this data over the frame length, which may be, for example, 26.6 milliseconds. If it is assumed that the fading from antenna 260 to a mobile station is independent of the fading from antenna 265 to the same mobile station, then the spacing between antennas 260 and 265 ensures that if one of antennas 260 and 265 is in a deep fade at a particular time, the other one of antennas 260 and 265 is in (at worst) a weak fade. The fading will be different for each mobile station in cell site 121 of base station 101, so it is not possible to simply choose the best antenna.

The present invention gets a diversity advantage by alternatively transmitting part of each frame from the good (or weakly faded) antenna and transmitting the remaining part of each frame from the bad (or weakly faded) antenna. Since switch 255 switches the composite transmit signal, including all of the overhead channel, this process is transparent to the mobile station. Thus, the present invention provides gains that are similar to phase sweep transmit diversity (PSTD). However, the present invention provides an additional advantage over PSTD, since the present invention only requires a single power amplifier for the two transmit antennas, whereas PSTD would require a separate power amplifier for each of antennas 260 and 265.

Moreover, in PSTD, the mobile station is guaranteed to be in a deep fade half of the time and is guaranteed to be completely out of the fade the other half of the time. In switched transmit diversity according to the principles of the present invention, the mobile station is not forced into and out of a fade. Another advantage over PSTD and other beam-forming methods is that the present invention does not require any antenna compensation or any other synchronization techniques between the power amplifiers.

FIG. 3 depicts timing diagrams that illustrate transmit diversity operations in exemplary base station 101 according to exemplary embodiments of the present invention. Timing diagram 305 illustrates an exemplary frame of data (i.e., Frame N) that is transmitted out of the block interleaver in BS 101. As noted above, each of antennas 260 and 265 ideally transmits one-half of the interleaver frame length. Timing diagram 310 depicts a switch control signal that switch controller 275 uses to operate switch 255. During time period A in timing diagram 310, forward channel data is transmitted from antenna 260 during the first half of Frame N. During time period B in timing diagram 310, forward channel data is transmitted from antenna 265 during the second half of Frame N.

It is not necessary that data be transmitted in contiguous blocks during each frame from each of antennas 260 and 265, as in timing diagram 310. In alternate embodiments of the present invention, other timing schemes may be used. In a first alternate embodiment, timing diagram 315 depicts a switch control signal that switch controller 275 uses to operate switch 255. During the two time periods A in timing diagram 315, forward channel data is transmitted from antenna 260 during the first and third quarters of Frame N. During the two time periods B in timing diagram 315, forward channel data is transmitted from antenna 265 during the second and fourth quarters of Frame N.

In a second alternate embodiment, timing diagram 320 depicts a switch control signal that switch controller 275 uses to operate switch 255. During the four time periods A in timing diagram 320, forward channel data is transmitted from antenna 260 during the first, third, fifth and seventh eighths of Frame N. During the four time periods B in timing diagram 320, forward channel data is transmitted from antenna 265 during the second, fourth, sixth and final eighths of Frame N.

While, in the ideal case, each of antennas 260 and 265 transmits one-half of the interleaver frame length, this is not required. In still other alternate embodiments of the present invention, different fractional portions of the interleaver frame length may be transmitted from each of antennas 260 and 265. For example, if a frame comprises fifteen (15) slots, antenna 260 may transmit eight slots while antenna 265 transmits seven slots, rather than having each of antennas 260 and 265 transmit seven and one half slots. Thus, the transmission of Frame N may be split, for example, 55%/45%, or 60%/40%, or some other ratio, between antennas 260 and 265.

The present invention requires only minor changes to the software of BS 101 in order to perform power control in the reverse channel. These changes are made to synchronize (or match) the power control bits received from the mobile station to the correct transmit antenna that was in use when the mobile station generated those power control bits. The reason for this is based on the fact that the channel from each transmit antenna to the mobile station will fade independently. Therefore, the power control information generated by the mobile station while receiving from antenna 260 is not applicable to the time period when the mobile station is receiving from antenna 265. Since current channel models generally predict a delay spread of 5-10 microseconds and the power control bits are calculated over 1.25 milliseconds, the delay spread should not influence this algorithm. Advantageously, since the mobile station does channel estimation based on 1.25 millisecond wide slots and the present invention switches more slowly than the slot rate, the present invention requires no changes in the mobile station.

The present invention provides numerous advantages over OTD and PSTD diversity schemes. Unlike PSTD and OTD, the present invention requires only one power amplifier for two transmit antennas. In PSTD, the mobile station is guaranteed to be in a deep fade half the time and guaranteed to be completely out of a fade half the time. In a switched transmit diversity according to the principles of the present invention, the mobile station is not forced into or out of a fade. Moreover, unlike PSTD and other beam-forming methods, the present invention does not require any antenna compensation or any other synchronization techniques between the power amplifiers of two different transmit paths. Additionally, in other transmit diversity techniques, all overhead channels must be continuously transmitted on all antennas, which means lower spectral efficiency.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a base station capable of communicating with a plurality of mobile stations in a coverage area of said wireless network, said base station comprising:
 a first transmit antenna;
 a second transmit antenna;
 a radio frequency (RF) transceiver capable of generating an outgoing radio frequency (RF) signal to be transmitted via said first and second transmit antennas to said plurality of mobile stations; and
 a switch coupling said RE transceiver to said first and second transmit antennas, wherein said switch alternately directs a first and a second portion of a forward channel data frame associated with said outgoing RE signal to said first transmit antenna and said second transmit antenna at a rate that is anproximately 2M times the frame rate of said forward channel data frame.

2. The base station as set forth in claim 1, wherein said switch directs said outgoing RE signal to said first transmit antenna during said first portion of a forward channel data frame and directs said outgoing RE signal to said second transmit antenna during a remaining portion of said forward channel data frame.

3. The base station as set forth in claim 2, wherein said switch directs said outgoing RE signal to said first transmit antenna during approximately one-half of the duration of said forward channel data frame and directs said outgoing RE signal to said second transmit antenna during approximately one-half of the duration of said forward channel data frame.

4. The base station as set forth in claim 3, wherein said switch directs said outgoing RE signal to said first transmit antenna during approximately a contiguous one-half of the duration of said forward channel data frame and directs said outgoing RF signal to said second transmit antenna during approximately a contiguous one-half of the duration of said forward channel data frame.

5. The base station as set forth in claim 1, wherein M is an integer value.

6. The base station as set forth in claim 1, wherein said base station transmits according to the IS-2000 standard.

7. The base station as set forth in claims 1, wherein said base station transmits according to the IS-95 standard.

8. The wireless network as set forth in claim 1, wherein said base station transmits according to the IS-2000 standard.

9. The wireless network as set forth in claim 1, wherein said base station transmits according to the IS-95 standard.

10. A wireless network comprising a plurality of base stations capable of communicating with a plurality of mobile stations in a coverage area of said wireless network, wherein each of said base stations comprises:
- a first transmit antenna;
- a second transmit antenna;
- a radio frequency (RF) transceiver capsule of generating an outgoing radio frequency (RF) signal to be transmitted via said first and second transmit antennas to said plurality of mobile stations; and
- a switch coupling said RF transceiver to said first and second transmit antennas, wherein said switch alternately directs a first and a second portion of a forward channel data frame associated with said outgoing RF signal to said first transmit antenna and said second transmit antenna at a rate that is approximately 2M times the frame rate of said forward channel data frame.

11. The wireless network as set forth in claim 9, wherein said switch directs said outgoing RF signal to said first transmit antenna during a said first portion of a forward channel data frame and directs said outgoing RF signal to said second transmit antenna during a remaining portion of said forward channel data frame.

12. The wireless network as set forth in claim 11, wherein said switch directs said outgoing RF signal to said first transmit antenna during approximately one-half of the duration of said forward channel data frame and directs said outgoing RF signal to said second transmit antenna during approximately one-half of the duration of said forward channel data frame.

13. The wireless network as set forth in claim 12, wherein said switch directs said outgoing RF signal to said first transmit antenna during approximately a contiguous one-half of the duration of said forward channel data frame and directs said outgoing RF signal to said second transmit antenna during approximately a contiguous one-half of the duration of said forward channel data frame.

14. The wireless network as set forth claim 1, wherein M is an integer value.

15. For use in a base station capable of communicating with mobile stations in a coverage area of a wireless network, a method of transmitting forward channel signal from the base station the method comprising:
- in a radio frequency (RF) transceiver, generating an outgoing radio frequency (RF) signal to be transmitted to the plurality of mobile stations;
- transmitting the outgoing RF signal from a first transmit antenna during a first portion of a forward channel data frame; and
- transmitting the outgoing RF signal from a second transmit antenna during a remaining portion of the forward channel data frame,
- wherein the step of transmitting the outgoing RF signal from the first transmit antenna and the step of transmitting the outgoing RF signal from the second transmit antenna comprise switching the outgoing RF signal between the first transmit antenna and the second transmit antenna at a rate that is approximately 2M times the frame rate of the forward channel data frame.

16. The method as set forth in claim 15, wherein the step of transmitting the outgoing RF signal from the first transmit antenna comprises the sub-step of transmitting the outgoing RF signal from the first transmit antenna during approximately one-half of the duration of the forward channel data frame.

17. The method as set forth in claim 16, wherein the step of transmitting the outgoing RF signal from the second transmit antenna comprises the sub-step of transmitting the outgoing RF signal from the second transmit antenna during approximately one-half of the duration of the forward channel data frame.

* * * * *

UNITED STATES PATENT AND TRADEMARK OFFICE
CERTIFICATE OF CORRECTION

| | | |
|---|---|---|
| PATENT NO. | : 7,366,140 B2 | Page 1 of 1 |
| APPLICATION NO. | : 11/056216 | |
| DATED | : April 29, 2008 | |
| INVENTOR(S) | : Cornelius van Rensburg and Purva R. Rajkotia | |

It is certified that error appears in the above-identified patent and that said Letters Patent is hereby corrected as shown below:

Column 8, claim 1, line 37, delete "RE" and replace with --RF--;

Column 8, claim 1, line 40, delete "RE" and replace with --RF--;

Column 8, claim 1, line 42, delete "anproximately" and replace with --approximately--;

Column 8, claim 2, line 45, delete "RE" and replace with --RF--;

Column 8, claim 2, line 47, delete "RE" and replace with --RF--;

Column 8, claim 3, line 51, delete "RE" and replace with --RF--;

Column 8, claim 3, line 54, delete "RE" and replace with --RF--;

Column 8, claim 4, line 58, delete "RE" and replace with --RF--;

Column 9, claim 10, line 14, delete "capsule" and replace with --capable--; and

Column 10, claim 14, line 5, insert --in-- before the term "claim".

Signed and Sealed this

Eighth Day of December, 2009

David J. Kappos
*Director of the United States Patent and Trademark Office*